United States Patent [19]

Gillis

[11] Patent Number: 5,338,238
[45] Date of Patent: Aug. 16, 1994

[54] COMPRESSION MOLDED WATER SKI AND METHOD OF MAKING THE SAME

[75] Inventor: Donald B. Gillis, Lake Stevens, Wash.

[73] Assignee: Connelly Skis, Inc., Lynnwood, Wash.

[21] Appl. No.: 931,211

[22] Filed: Aug. 14, 1992

[51] Int. Cl.⁵ .............................................. B63B 35/81
[52] U.S. Cl. .......................................... 441/68; 441/65
[58] Field of Search ........................... 441/65, 68, 74; 114/357; 280/610

[56] References Cited

U.S. PATENT DOCUMENTS

| | | | |
|---|---|---|---|
| 2,531,946 | 11/1950 | Parker | 9/11 |
| 3,027,575 | 4/1962 | Fortin | 9/310 |
| 3,067,440 | 12/1962 | Blake | 441/68 |
| 3,635,483 | 1/1972 | Barriball et al. | 280/11.13 |
| 3,774,254 | 11/1973 | Meyer | 280/11.13 |
| 3,816,573 | 6/1974 | Hashimoto et al. | 280/610 X |
| 3,827,096 | 8/1974 | Brownson | 280/11.13 |
| 3,902,732 | 9/1975 | Fosha, Jr. et al. | 280/11.13 |
| 3,918,731 | 11/1975 | Legrand | 280/610 |
| 4,386,982 | 6/1983 | Weinhaus | 156/79 |
| 4,457,729 | 7/1984 | Peerlkamp | 441/74 |
| 4,608,023 | 8/1986 | Williams | 441/68 |
| 4,711,462 | 12/1987 | Hayashi et al. | 280/610 |
| 4,713,032 | 12/1987 | Frank | 441/74 |
| 4,731,038 | 3/1988 | Hancock et al. | 441/68 |
| 4,798,549 | 1/1989 | Hirsch | 441/74 |
| 4,897,063 | 1/1990 | Scheurer et al. | 441/68 |
| 5,056,807 | 10/1991 | Comert et al. | 280/610 |

Primary Examiner—Sherman Basinger
Attorney, Agent, or Firm—Christensen, O'Connor, Johnson & Kindness

[57] ABSTRACT

A core for a water skimming device, such as a water ski, is formed by lining a mold with flexible top and bottom films of acrylic sheet material, followed by injecting structural foam into the mold between the films. The structural foam sets in contact with the films and is encapsulated in and bonded to them. The encapsulated core is wrapped in fibrous reinforcing material, which then is impregnated with thermosetting adhesive. The assembly of core, reinforcing material, adhesive and an outer layer is compression molded to cure the adhesive, which readily bonds the encapsulated core to the outer shell.

15 Claims, 10 Drawing Sheets

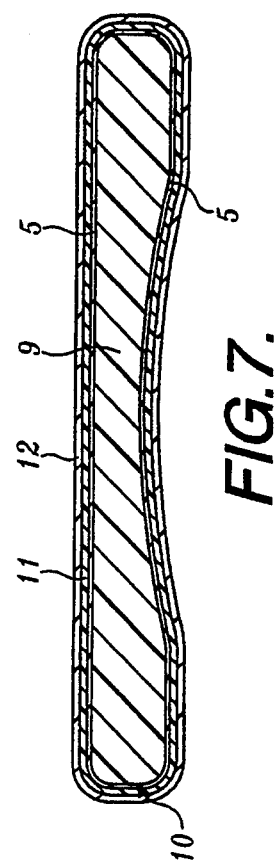
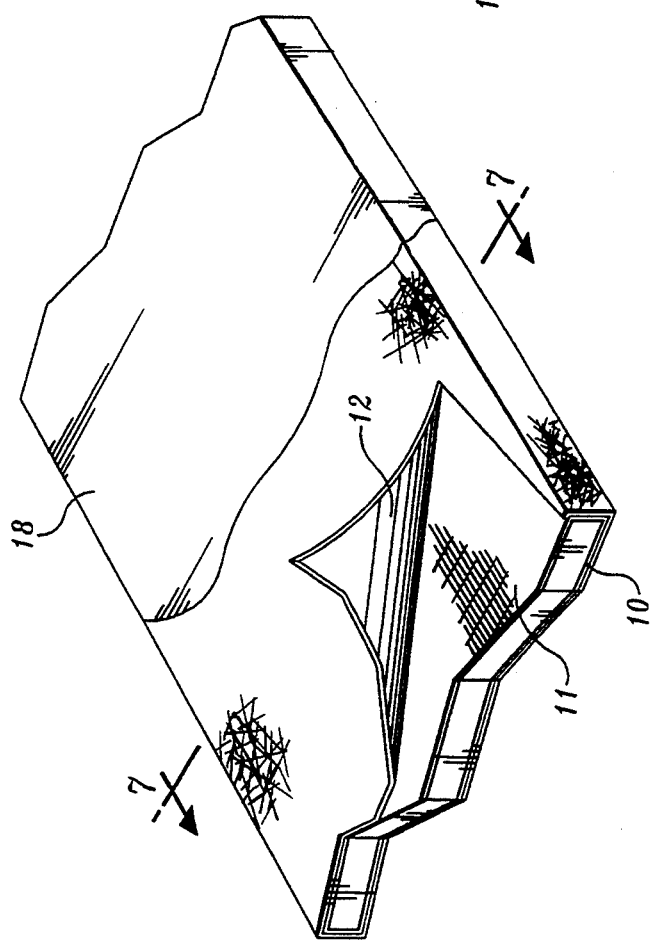

COMPRESSION MOLDED WATER SKI AND METHOD OF MAKING THE SAME

FIELD OF THE INVENTION

The present invention relates to the general field of aquatic sports devices. More specifically, the present invention relates to water skimming devices, particularly water skis.

BACKGROUND OF THE INVENTION

Modern water skis can be laminates of plastics and other materials. For example, Hancock et al. U.S. Pat. No. 4,731,038, issued Mar. 15, 1988, discloses a water ski having a "preformed core" consisting of a wide top "outer deck" joined to a narrower and lower "inner plate" by a thin intervening layer of rigid plastic foam or honeycomb material. Preferably the outer deck and inner plate are aluminum, although they can be plastic. The composite core can be formed by placing the inner plate in the bottom of the cavity of a mold, laying the outer deck on the mold so that it bridges across the mold cavity, filling the space between the deck and the plate with "reaction injected molding material" and allowing such material to set or cure. The composite core is removed from the mold and placed with the laterally projecting lips of the outer deck resting on the rim of a mold having a larger cavity which is shaped to have the desired contour of the bottom and sides of the finished ski. The inner plate and foam layer are located within the mold cavity, spaced inward from the sides of the cavity and a substantial distance above the bottom. The mold is closed and a softer foam is injected to surround the inner plate and upper rigid foam layer below the outer deck. The softer foam forms the "body" of the ski, i.e., the bottom and the side portions below the lip of the top deck. After removal from the second mold, the top deck is trimmed flush with the sides of the softer ski body to complete construction of the ski, although a "finish coating" can be added if desired.

Sheurer et al. U.S. Pat. No. 4,897,063, issued Jan. 30, 1990, discloses a plastic ski having an internal reinforcing skeleton of steel rods positioned by plastic clips. Such skeleton is placed in a mold and polyurethane foam is injected and allowed to set or cure to form the ski. A preformed reinforcing bottom sheet or preformed reinforcing top sheet can be placed in the mold prior to injection of polyurethane foam to form one finish surface of the ski.

Weinhaus U.S. Pat. No. 4,386,982, issued Jun. 7, 1983, discloses another laminated water ski. In the case of the Weinhaus construction, top and bottom preformed shells have interlocking sides. The space between them is filled with "a predetermined quantity of liquid formable resin" and allowed to cure to form the composite ski.

Another known method of manufacturing a laminated ski is to form a thin bottom shell having the desired contour of the bottom and sides of the finished ski and to mold separately a rigid polyurethane core having substantially the desired shape of the ski. The core is wrapped with one or more mats, tapes or fabrics of fibrous reinforcement and coated with thermosetting epoxy resin. The shell is placed in a mold having a cavity of the same contour as the shell, followed by insertion of the wrapped and epoxy-coated core. The coated core is placed inside the shell and then is covered by a top plastic deck sheet. The mold is closed and sufficient heat and pressure are applied to set the resin for bonding the layers together. However, since the preformed polyurethane core typically has a slick, smooth outer surface, it is necessary to abrade the outer surface of the core, such as by sanding, sand blasting or another manner of etching or roughening in order to achieve a firm bond between the core and the top deck and bottom shell.

Peerlkamp U.S. Pat. No. 4,457,729, issued Jul. 3, 1984, is concerned with the problem of bonding polyolefin plastics to a substrate or core. For example, it is stated in the paragraph beginning at column 1, line 19:

> To adhere polyethylene to a substrate, an adhesive must be used, or the surface of the polyethylene or the substrate must be etched. However, adhesives effect only a limited degree of adhesion due to the poor bonding properties of polyethylene.

The solution proposed by Peerlkamp was to rotomold an outer layer of "stabilized polyolefin" and, while the outer layer remains in the mold, cover the interior of the outer layer with an "unstabilized or hardly stabilized" polyolefin, prior to introducing a foaming plastic such as polyurethane into the interior of the mold. Peerlkamp states that this results in very good adhesion between the polyurethane foam and the unstabilized or hardly stabilized polyethylene, and between the unstabilized or hardly stabilized polyethylene and the outer layer of polyethylene.

In addition to manufacturing complexities and difficulty in bonding layers of laminated water skis, in the past it has been difficult to vary factors that affect performance of the ski independently of other performance-affecting factors. Such factors include the outline shape of the ski, bottom contour, edge profile, weight of the ski and its stiffness. Conventionally, stiffness is varied by changing the materials used in the manufacture of the ski, which may require a change in the manufacturing process, or by increasing the thickness of the ski. Changing materials or ski thickness can affect the weight of the ski, and changing thickness also affects the edge profile. Thus, in the conventional method, stiffness cannot be varied without affecting one or more other performance characteristics.

SUMMARY OF THE INVENTION

The present invention provides laminated water skimming devices, particularly water skis, that are compression molded using preformed cores without requiring mechanical abrasion of the surface of the cores in order to achieve a secure adhesive bond to outer plastic shells or layers of the ski. The core can be polyurethane which is injected into a mold between thin top and bottom films of flexible plastic, preferably modified acrylic sheet material. The result is a foam core encapsulated in a thin plastic film with a secure bond between the foam and the film. The encapsulated core preferably is wrapped in fibrous reinforcing material which then is impregnated with suitable thermosetting adhesive. The assembly of core, reinforcing material, adhesive and an outer layer is compression molded to cure the adhesive which readily bonds the encapsulated core to the outer shell. As compared to injection molding processes, compression molding has the advantages of lower tooling costs and less clamping pressure being required, resulting in less costly capital equipment, in addition to less waste, little mastication resulting in alteration of mechanical properties and a lighter finished product.

Since no mechanical abrasion of the core is required, it is dimensionally precise will achieve a substantially perfect fit with a preformed outer shell of the ski.

Another aspect of the present invention is the provision of a structurally contoured top for the compression molded ski. This allows the stiffness of the ski to be adjusted along its length, which can affect performance of the ski without undesirably changing the weight or the edge profile. It is important that the shape of the structurally contoured top be complemental to the shape of the core so that a precise mating fit and tight bond of the two ski parts are achieved.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 6 is a diagrammatic top perspective of a fragment of a water ski in the process of manufacture having a core in accordance with FIG. 5; and FIG. 7 is a transverse vertical section along line 7—7 of FIG. 6.

DETAILED DESCRIPTION OF THE PREFERRED EMBODIMENT

Figure 2:
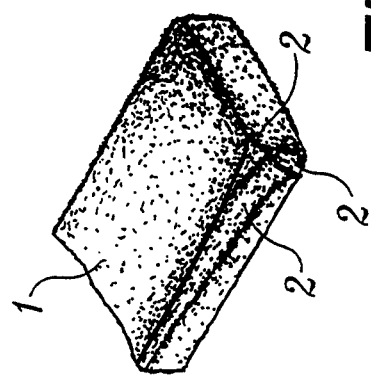
FIG. 2 is a top perspective of an end portion of the core of FIG. 1 after sanding.
Figure 1:
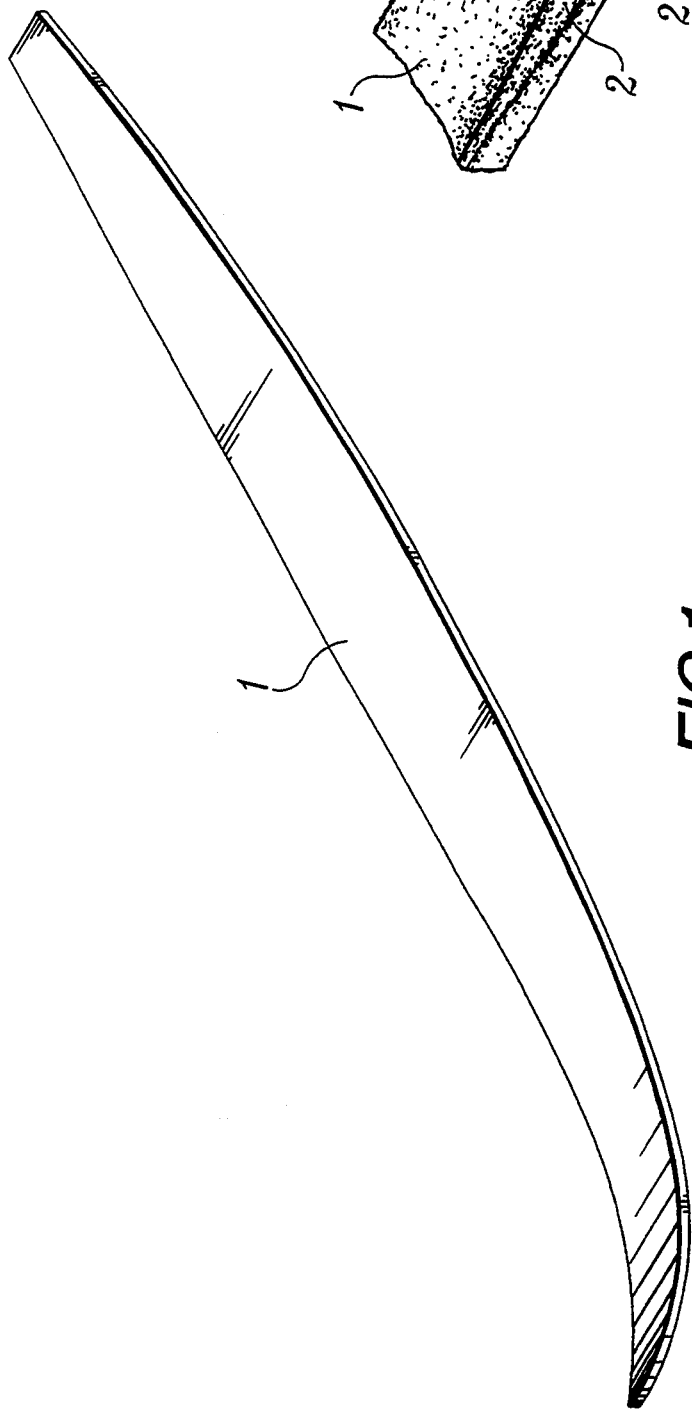
FIG. 1 is a top perspective of a conventional preformed core to be used in a compression molded ski.

With reference to FIG. 1 and FIG. 2, in a conventional method of water ski manufacture, a preformed core 1 of plastic foam material such as polyurethane is formed in a mold. When the foam material has set, the core is removed and any flash is trimmed. The preformed core is of substantially the same shape as the desired finished water ski. The core is wrapped in fibrous reinforcing fabric, tape or mat and is secured to outer plastic shells or sheets by adhesive, such as epoxy resin adhesive. Compression molding can be used to cure the epoxy. One or more of the outer shells or sheets may be thermoformed to the desired finished shape of the bottom of the ski.

The molded and trimmed core 1 typically has a smooth and slick outer surface which may not reliably bond to other laminae of the ski by use of standard adhesives. Consequently, as illustrated in FIG. 2, the outer surfaces of the core 1 are mechanically abraded, usually by sanding. Sanding is messy, time consuming and expensive. In addition, sanding alters the physical dimensions of the core. For example, improper, but all too common, sanding of the tail end portion of the core shown in FIG. 2 has formed substantial bevels 2 along one corner and edge such that the core would not fit precisely in a preformed outer shell. The result is that the physical appearance and structural integrity of the resulting composite water ski may be jeopardized.

Figure 3:
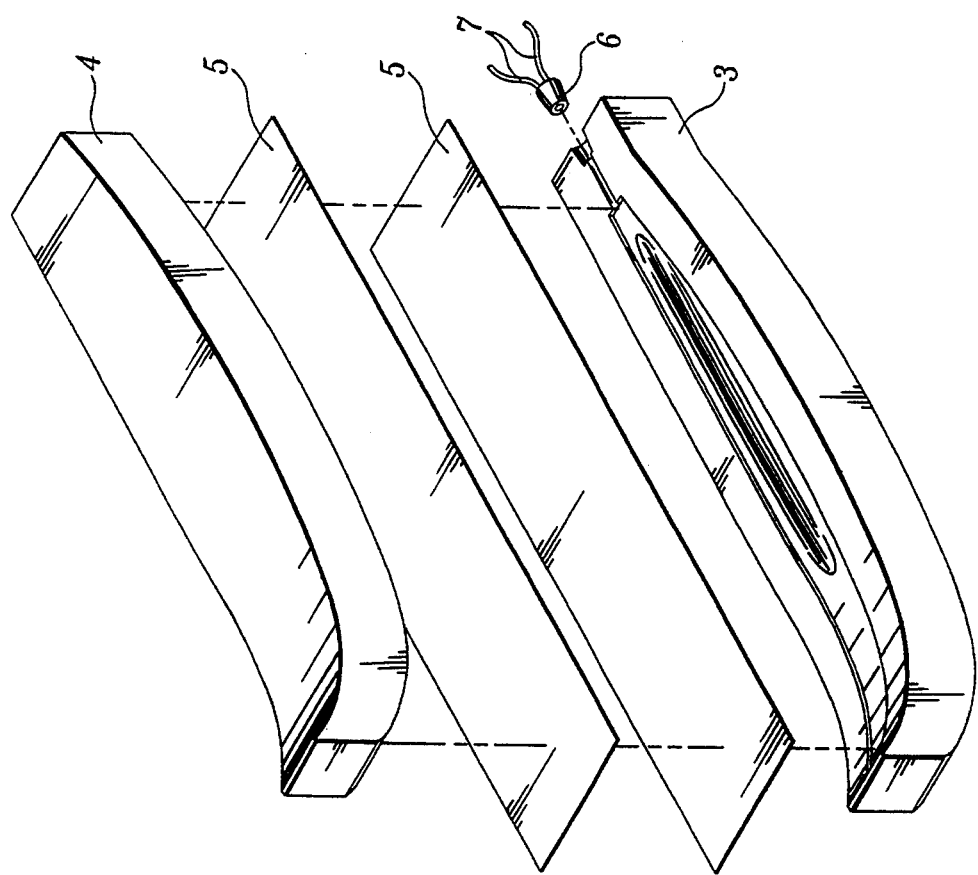
FIG. 3 is a diagrammatic top perspective of a mold and plastic sheets or films for forming a core used in making a compression molded water ski in accordance with the present invention, with pans shown in exploded relationship.

In accordance with the present invention, a core for a compression molded water ski is preformed in such a way that sanding or other mechanical abrasion to achieve secure adhesion of the various laminae is not required. With reference to FIG. 3, a standard mold including bottom and top mold halves 3 and 4, respectively, is lined with thin rectangular plastic sheets or films 5. The bottom sheet is laid in the bottom mold half 3, followed by insertion of a conventional injection nozzle 6 over such sheet. The upper sheet is laid over the nozzle and the bottom sheet, whereupon the mold halves are brought together. The top and bottom sheets 6 are of a size sufficient to line the top portion, bottom portion, and opposite side portions of the mold cavity. Foam-forming resin and catalyst are injected into the closed mold between the sheets 5 though hoses 7 and nozzle 6 and are set or cured in the heated mold. In a representative embodiment, the core structural plastic material is rigid, high-density, closed-cell polyurethane foam such as the foam (resin and catalyst) sold under the trademark "Baydur 655 System" available from Mobay Corporation of Pittsburgh, Pa. Preferably the plastic sheets 5 are modified acrylic film such as the acrylic film sold under the trademark KORAD available from Polymer Extruded Products, Inc., of Newark, N.J. The modified acrylic film is flexible but dimensionally stable, i.e., substantially nonresilient.

Figure 5:
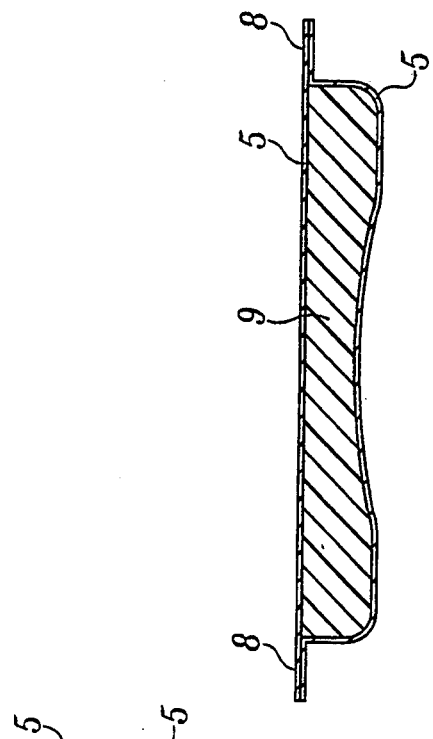
FIG. 5 is a transverse vertical section along line 5—5 of FIG. 4.
Figure 4:
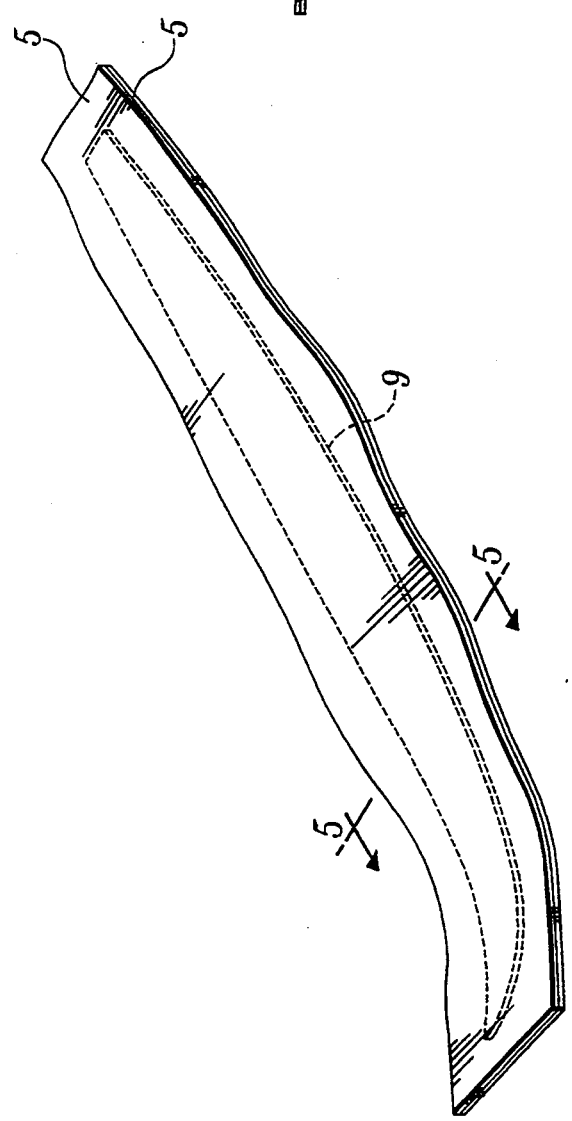
FIG. 4 is a diagrammatic top perspective of an encapsulated core made by use of the apparatus shown in FIG. 3.

The resulting encapsulated core is illustrated in FIGS. 4 and 5 (in the drawings the thicknesses of different sheets and laminae are exaggerated for ease of illustration). By setting the polyurethane foam in contact with the acrylic film, a secure bond of the foam material to the film is achieved without sanding of the polyurethane. In addition, the thermoplastic acrylic sheets are secured together in the areas where they abut and overlap, including the lips 8 (FIG. 5) projecting outward beyond the opposite sides of the inner polyurethane layer 9.

The thickness of the polyurethane layer is many times greater than the thickness of the acrylic sheets. In a representative embodiment, the polyurethane layer can have a thickness of about ½ inch to about 1 inch as compared to the preferred film thickness of about 0.003 inch. The overlapping margins or lips 8 of the films are trimmed flush with the upright sides of the composite core. The resulting encapsulated core has precisely the desired shape and dimensions determined by the shape and dimensions of the mold cavity with no alteration as would likely occur if a conventional polyurethane core were sanded.

With reference to FIG. 6, the composite encapsulated core 10 can be wrapped in fibrous reinforcement which can include an inner fabric layer 11 having unidirectional strands extending lengthwise of the core and an outer mat 12 of chopped strand fiber. Conventional fibrous reinforcement can be used, including graphite, glass, or carbon. At this stage, the resulting structure is as shown in FIG. 7, including the inner polyurethane foam layer 9, top and bottom acrylic films or sheets 5 and reinforcement layers 11 and 12, all conforming closely to the shape of the inner structural foam.

Figure 8:
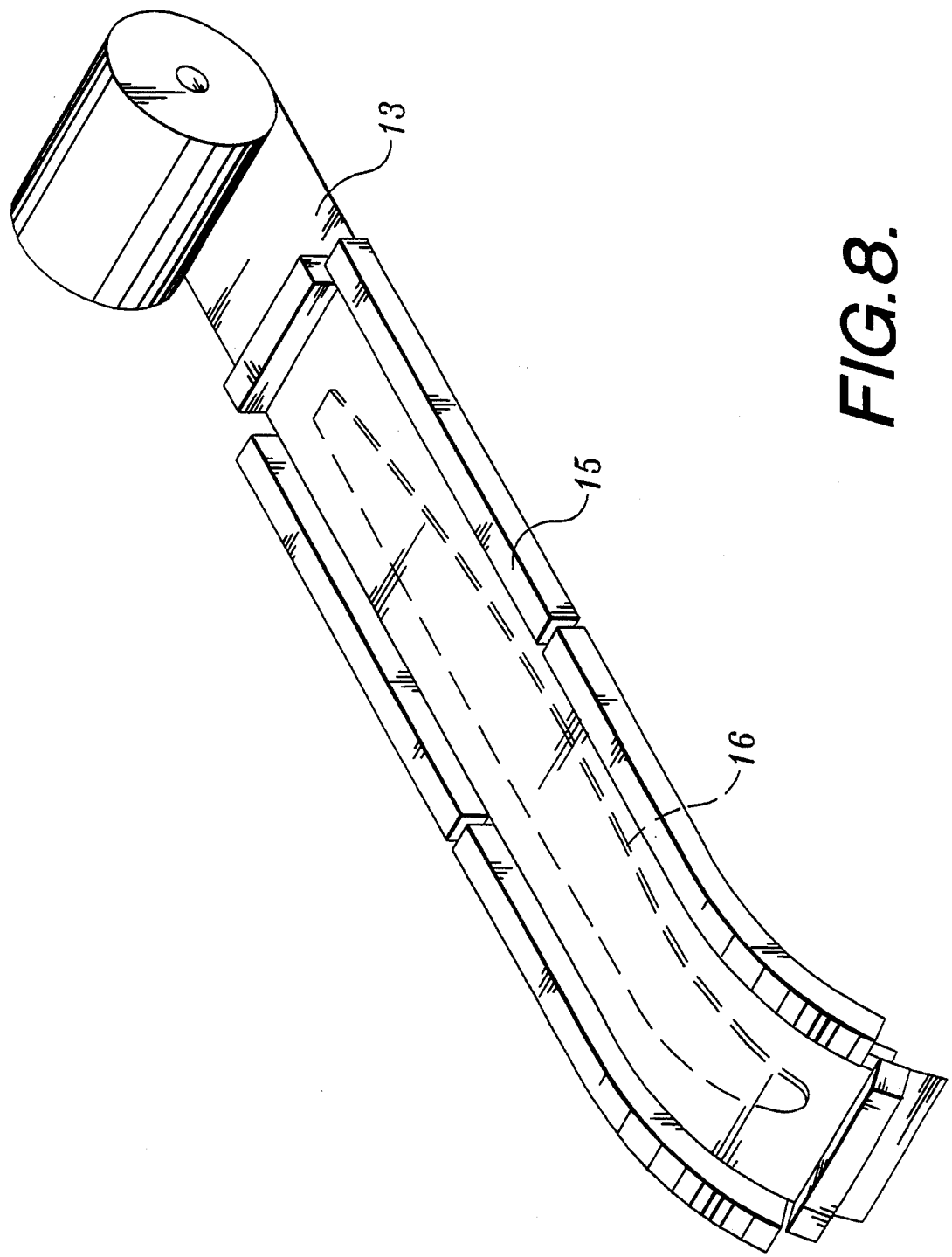
FIG. 8 is a diagrammatic top perspective of apparatus for forming an outer bottom shell for a compression molded ski in accordance with the present invention.
Figure 9:
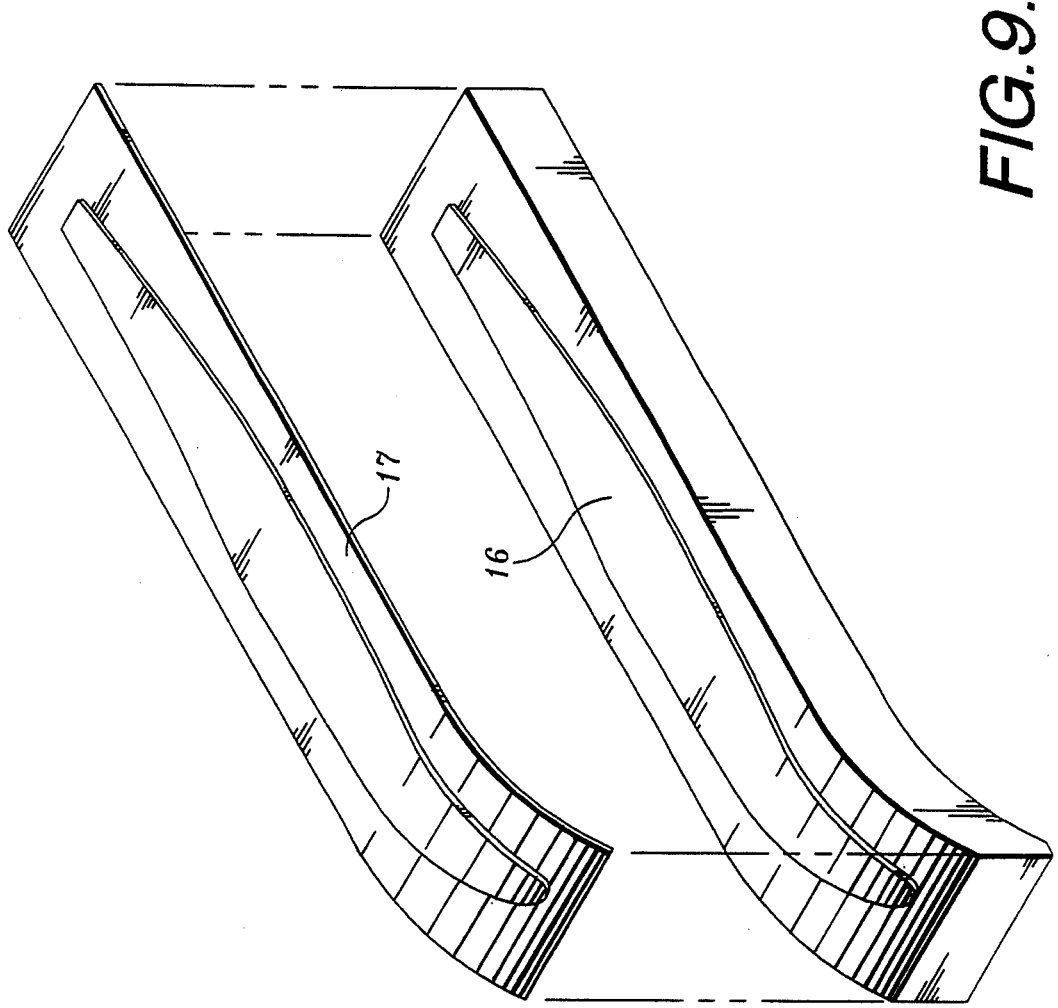
FIG. 9 is a diagrammatic top perspective illustrating removal of a shell from such apparatus.

With reference to FIG. 8 and FIG. 9, preferably a thin preformed plastic shell is formed for the ski bottom. In a representative embodiment, such shell can be formed of a modified acrylic material such as the KORAD material which is substantially thicker than the films 5, preferably about 0.006 inch thick. As illustrated diagrammatically in FIG. 8, the thicker acrylic sheet 13 can be thermoformed by first clamping a length of it in a frame 15, followed by heating of the sheet and pressing it downward over a form or plug 16 having the desired shape of the ski bottom and sides. For example, the ski bottom can be of concave or "tunnel" configuration for enhancing performance. FIG. 9 illustrates the removal of the resulting shell 17 from the plug 16.

Figure 10:
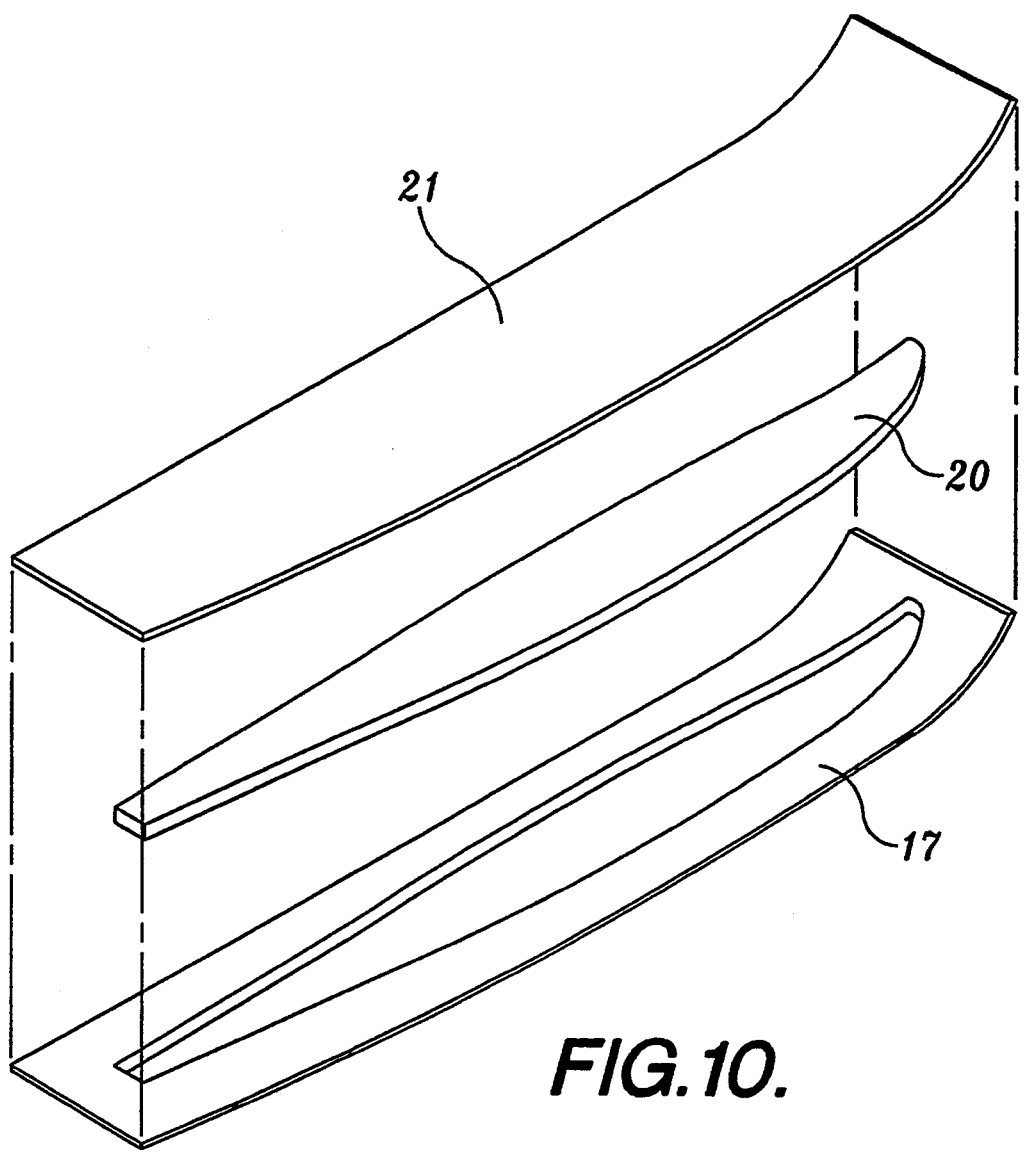
FIG. 10 is a top perspective illustrating components of a compression molded ski in accordance with the present invention, namely, a core, bottom shell and top deck, with parts shown in exploded relationship.
Figure 11:
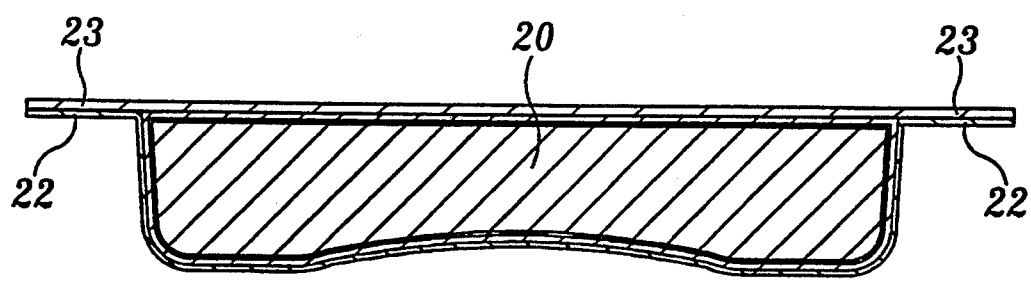
FIG. 11 is a vertical transverse section of a compression molded ski in accordance with the present invention made by use of the components illustrated in FIG. 10.

With reference to FIG. 6, the next step is to apply a coating 18 of fluid adhesive to the wrapped core, preferably a thermosetting epoxy such as that sold under the trademark "EPON Resin 828" available from Shell Chemical Corporation of Houston, Tex. With reference to FIG. 10, the wrapped and epoxy-coated core 20 is inserted into the preformed bottom shell 17 which rests in a complementary cavity of compression molding equipment (not shown). The shell for the ski can be completed by a top plastic deck sheet 21 which can be an ABS plastic, such as "LUSTRAN ABS 841" available from Tetra Plastics Incorporated of Chesterfield, Mo. Preferably the ABS plastic is coextruded with the modified acrylic (KORAD) to have an acrylic layer about 0.003 to 0.005 inch thick below an ABS plastic layer about 0.030 inch thick. Alternatively, the top deck sheet can be a sheet of flexible acrylic, such as another sheet of KORAD material of a thickness of about 0.006 inch, or the top and/or bottom layer can be a fluid thermosetting epoxy resin or gel coat. The laminae (wrapped and coated core 20 and all outer layers) are clamped in a heated compression mold (not shown) to cure the thermosetting epoxy adhesive. The resulting laminate is shown in cross section in FIG. 11. A secure bond is achieved between the encapsulated core 10 and the outer layers, such as the bottom shell 17 and top deck sheet 21, by the thermoset epoxy which penetrates the fibrous reinforcing layer 11, 12. In the preferred embodiment, the wrapped and coated core mates precisely with the bottom shell and top deck sheet so that neither the appearance nor the structural integrity of the ski is jeopardized. The outward projecting lips 22 of the bottom shell 17 and the overlapping margins 23 of the top sheet 21 are trimmed to complete manufacture of the ski.

Figure 12:
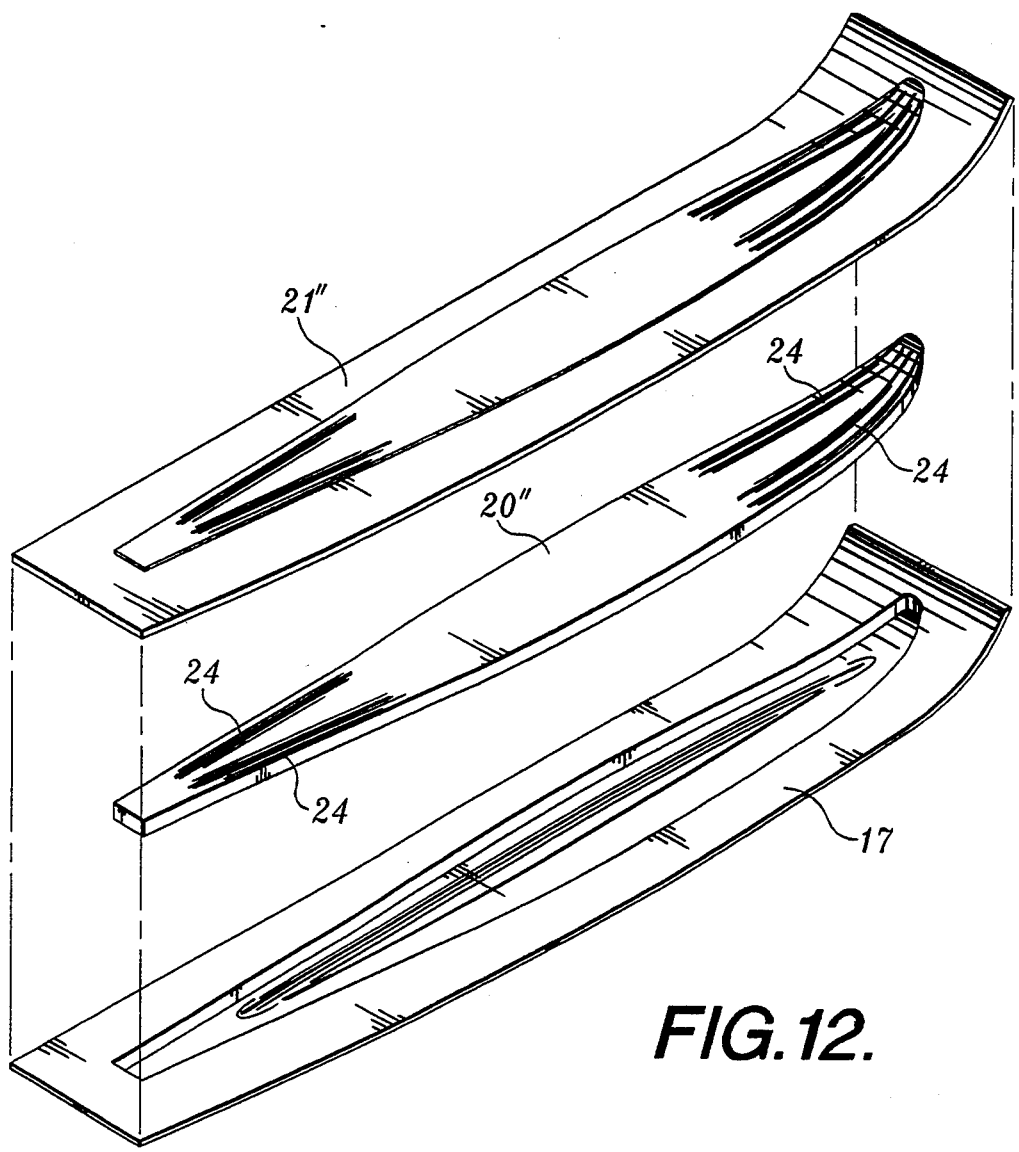
FIG. 12 is a top perspective illustrating components of a modified compression molded ski in accordance with the present invention, with parts shown in exploded relationship.
Figure 13:
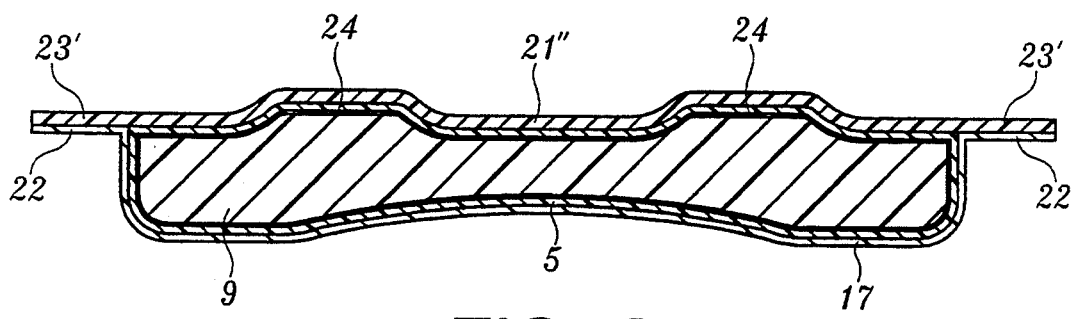
FIG. 13 is a transverse vertical section through the tip portion of a compression molded ski having a structurally contoured top in accordance with the present invention made by use of the components illustrated in FIG. 12.
Figure 14:
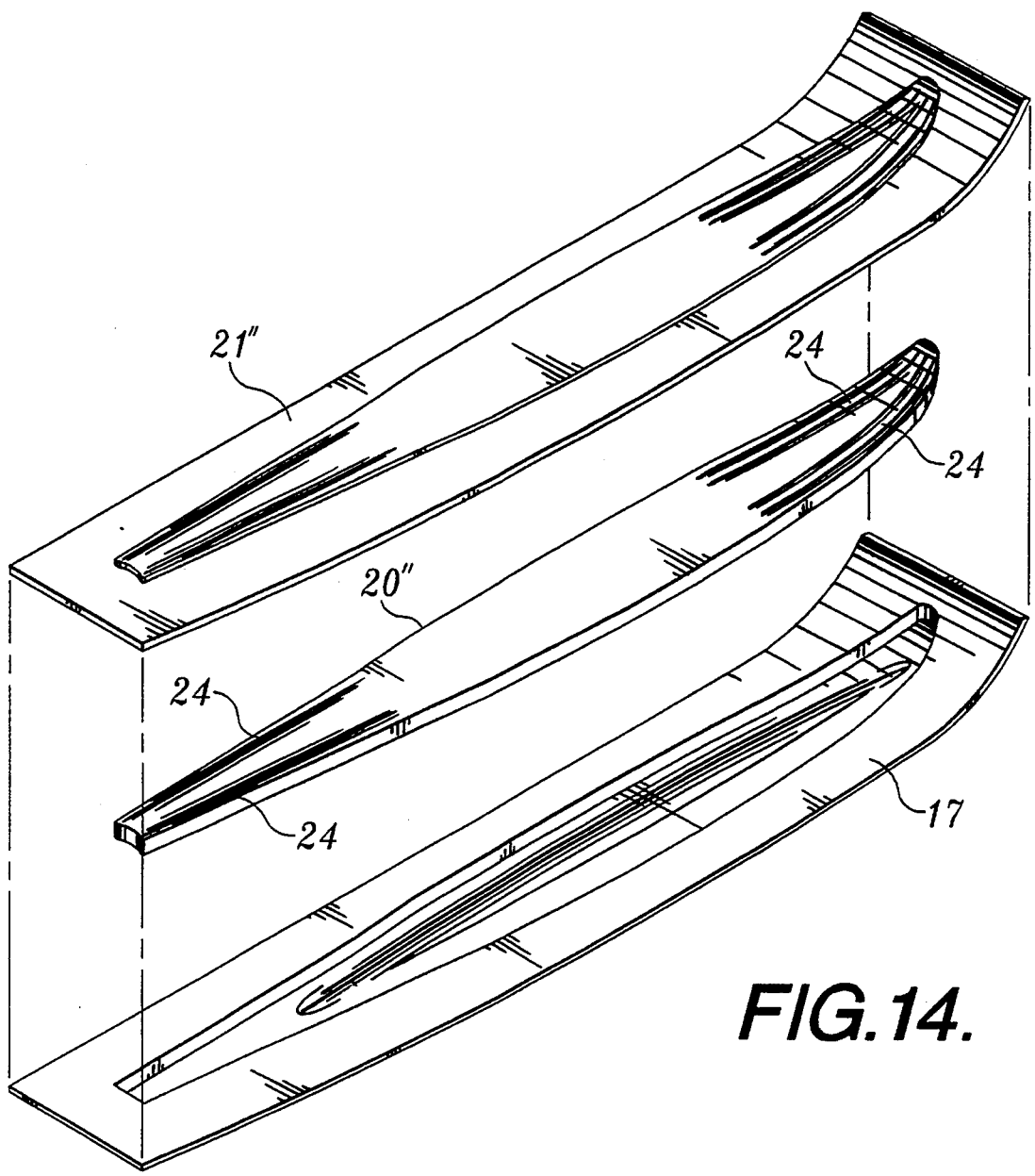
FIG. 14 is a top perspective illustrating components of another modified compression molded ski in accordance with the present invention, with parts shown in exploded relationship.
Figure 15:
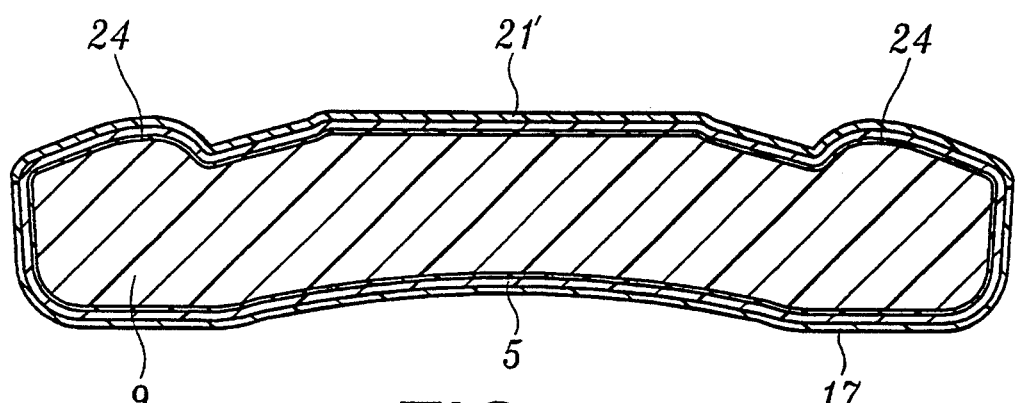
FIG. 15 is a vertical transverse section through the top portion of a compression molded ski having a structurally contoured top in accordance with the present invention made by use of the components illustrated in FIG. 14.

A second embodiment of compression molded ski made in accordance with the present invention is shown in FIGS. 12 and 13, and a third embodiment is shown in FIGS. 14 and 15. In each instance, the encapsulated, wrapped and epoxy-coated ski core 20' or 20" is formed as described above, except that structural stiffening ridges 24 are formed in the core during molding. In the illustrated embodiment the ridges are formed adjacent to the opposite longitudinal edges of the core, preferably in the upwardly curved tip portion of the ski core and/or in the tail portion of the core, both of which taper in width toward the adjacent end of the core. The preferred bottom shell 17 for the second and third embodiments is identical to the preferred shell of the first described embodiment. The top deck sheet 21' (FIG. 14) or 21" (FIG. 16) can be ABS plastic material as for the first described embodiment, but preferably is thermoformed to be shaped complemental to the associated core 20' or 20". Alternatively, the top sheet can be a thinner layer of flexible modified acrylic material, such as KORAD material. Another alternative is to apply a thermosetting epoxy resin or gel coat to form the outer surface of the ski. The top deck sheet or layer is shaped and bonded to the wrapped core in compression molding equipment (not shown), resulting in a laminated construction as illustrated in FIG. 13. The bottom shell 17 can have outward projecting flanges or lips 22 overlapped by the marginal portions 23' of the top sheet 21'. Such outward projecting portions can be trimmed to the condition illustrated in FIG. 15 which shows the third embodiment of the invention. In addition, in the embodiment illustrated in FIG. 13, the top sheet and bottom shell meet at approximately the top longitudinal edges of the ski, whereas in the embodiment shown in FIGS. 14 and 15, the top sheet 21" is wrapped around such edges so as to abut against the bottom shell 17 along the side of the ski which is preferred.

In either case, by providing a structurally contoured top and particularly a contoured top closely fitting an encapsulated core that does not require sanding, the stiffness of the ski can be varied along its length, such as by changing the stiffness in the upwardly curved tip portion and in the tapered tail portion, without altering the edge profile, without changing the materials or manufacturing process and without substantially increasing the weight of the ski.

Figure 16:
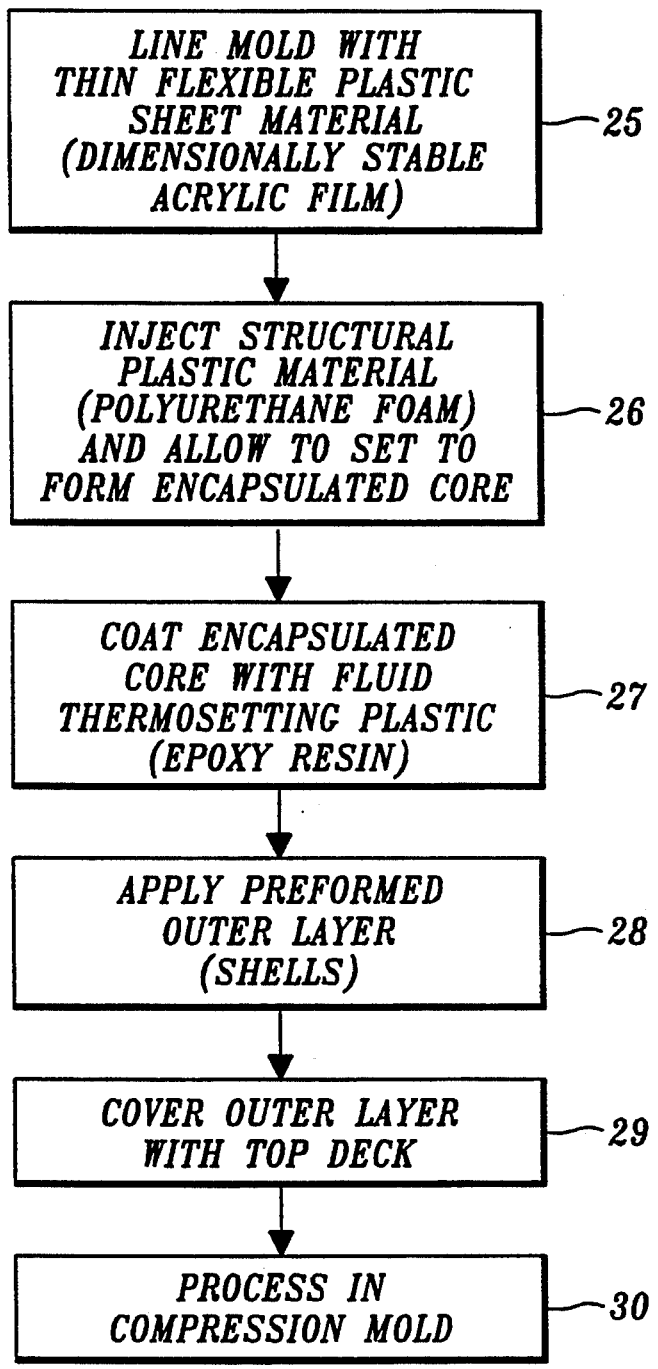
FIG. 16 is a block diagram representing steps in the method of making a compression molded water ski in accordance with the present invention.

FIG. 16 represents steps of the method of making a compression molded water ski in accordance with the present invention, regardless of whether or not the ski is provided with a structurally contoured top. As represented by box 25, the core mold is first lined with thin flexible plastic sheet material, preferably dimensionally stable acrylic film. Next, as represented by box 26, structural plastic material (preferably polyurethane foam) is injected into the mold between the flexible plastic sheets and allowed to set, thereby forming the core encapsulated in the thin flexible plastic sheet material. Then the outer surface layer is applied to the encapsulated core, such as by coating the core with thermosetting plastic, preferably epoxy resin, as represented by box 27, and applying a preformed outer layer or shell (box 28) and/or a top deck (box 29). Then, as indicated by box 30, the encapsulated core with the outer surface layer can be processed in a compression mold.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. The method of making a water skimming device which comprises sequentially performing the steps of:
    (a) lining a mold having a cavity of approximately the desired finished shape of the water skimming device with two layers of thin flexible plastic sheet material of a thickness many times less than the thickness of the mold cavity, the mold cavity having a top portion, a bottom portion and opposite side portions and the two layers of flexible plastic sheet material being of a size sufficient to line all of such portions of the cavity;
    (b) injecting structural plastic material into the mold between and in contact with the layers of plastic sheet material so as to fill the mold cavity with the structural plastic material inside the flexible plastic sheet material and to conform the flexible plastic sheet material to the shape of the mold cavity;
    (c) allowing the structural plastic material to set in the mold so as to form a core of the structural plastic material encapsulated in the sheet material and of a shape complemental to the mold cavity; and
    (d) bonding an outer surface layer to the encapsulated core.

2. The method defined in claim 1, including performing step (a) by lining the mold with two layers of flexible plastic sheet material which is dimensionally stable.

3. The method defined in claim 2, including performing step (a) by lining the mold with two layers of flexible, dimensionally stable acrylic film.

4. The method defined in claim 3, including performing step (b) by injecting polyurethane foam material into the mold between and in contact with the layers of acrylic film.

5. The method defined in claim 1, including selecting plastic sheet material for step (a) and structural plastic material for step (b) that will bond together during step (b) and step (c).

6. The method defined in claim 1, including in step (d):
    (e) coating the encapsulated core with a layer of fluid thermosetting plastic; and
    (h) processing the coated encapsulated core in a compression mold to cure the thermosetting plastic.

7. The method defined in claim 6, including during step (d):
    (f) applying a preformed plastic sheet material outer layer to the encapsulated core after step (e) but before step (h) so that the preformed outer layer is bonded to the encapsulated core during curing of the thermosetting plastic in the compression mold.

8. The method defined in claim 7, in which the plastic sheet material is flexible, dimensionally stable acrylic material and the preformed outer layer is acrylic material.

9. The method defined in claim 6, including during step (d) and after step (e):
    (f) inserting the coated encapsulated core in a preformed shell of plastic material; and
    (g) covering the core and shell with a top deck of solid plastic material prior to step (h) so that the shell and top deck are bonded to the encapsulated core during curing of the thermosetting plastic in the compression mold.

10. A water skimming device made by the process of claim 9.

11. The method defined in claim 1, including, before step (d), forming the encapsulated core in a mold with a nonplanar structurally contoured top.

12. The method defined in claim 11, including, before step (d), forming the encapsulated core in a mold with a nonplanar structurally contoured top having stiffening ridges.

13. A water skimming device made by the process of claim 1.

14. The method of making a water skimming device which comprises lining a mold having a cavity of approximately the desired finished shape of the device with two layers of flexible, dimensionally stable acrylic film of a thickness many times less than the thickness of the mold cavity, injecting polyurethane foam material into the mold between and in contact with the acrylic layers so as to fill the mold cavity, allowing the foam material to set in the mold so as to form a core of foam material encapsulated in and bonded to the acrylic film layers and of a shape complemental to the mold cavity, applying a layer of fluid thermosetting epoxy resin to the encapsulated core, and processing the coated encapsulated core in a compression mold to cure the epoxy resin.

15. The method defined in claim 14, including, prior to processing the coated encapsulated core, inserting the coated encapsulated core into a preformed shell of acrylic material so that following processing of the coated encapsulated core the shell is bonded to the core by the cured epoxy resin.

* * * * *

UNITED STATES PATENT AND TRADEMARK OFFICE
CERTIFICATE OF CORRECTION

PATENT NO. : 5,338,238
DATED : August 16, 1994
INVENTOR(S) : D.B. Gillis

It is certified that error appears in the above-indentified patent and that said Letters Patent is hereby corrected as shown below:

| COLUMN | LINE | |
|---|---|---|
| 3 | 28 | "pans" should read --parts-- |
| 4 | 27 | "comer" should read --corner-- |
| 6 | 16 | Following "core." insert --Such ridges are remote from the central portion or binding area of the ski which has a flat upper surface as shown in FIGURE 12 and FIGURE 14.-- |

Signed and Sealed this

Fifteenth Day of November, 1994

Attest:

BRUCE LEHMAN

Attesting Officer    Commissioner of Patents and Trademarks